US012406983B2

(12) United States Patent
Toshiro et al.

(10) Patent No.: US 12,406,983 B2
(45) Date of Patent: *Sep. 2, 2025

(54) LITHIUM ION SECONDARY BATTERY AND METHOD FOR MANUFACTURING SAME

(71) Applicant: Vehicle Energy Japan Inc., Hitachinaka (JP)

(72) Inventors: Hiroyuki Toshiro, Hitachinaka (JP); Yasuo Arishima, Hitachinaka (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,136

(22) Filed: Jun. 3, 2024

(65) Prior Publication Data

US 2024/0322125 A1  Sep. 26, 2024

Related U.S. Application Data

(63) Continuation of application No. 17/292,293, filed as application No. PCT/JP2019/042865 on Oct. 31, 2019, now Pat. No. 12,034,150.

(30) Foreign Application Priority Data

Nov. 13, 2018 (JP) ................................ 2018-212635

(51) Int. Cl.
*H01M 4/36* (2006.01)
*H01M 4/131* (2010.01)
(Continued)

(52) U.S. Cl.
CPC .......... *H01M 4/364* (2013.01); *H01M 4/131* (2013.01); *H01M 4/139* (2013.01); *H01M 4/366* (2013.01);
(Continued)

(58) Field of Classification Search
None
See application file for complete search history.

(56) References Cited

U.S. PATENT DOCUMENTS

2001/0012588 A1* 8/2001 Kaido ................. H01M 4/0435
118/58
2003/0073002 A1* 4/2003 Imachi ................. H01M 4/364
429/224

(Continued)

FOREIGN PATENT DOCUMENTS

JP    2007-026676 A    2/2007
JP    2007-214038 A    8/2007
(Continued)

OTHER PUBLICATIONS

Machine Translation of JP5002872 (Year: 2012).*
(Continued)

*Primary Examiner* — Wyatt P Mcconnell
(74) *Attorney, Agent, or Firm* — Volpe Koenig

(57) ABSTRACT

A lithium ion secondary battery with increased durability and capacity includes a positive electrode, a negative electrode, and a separator. The positive electrode includes a current collector foil and an electrode mixture layer disposed on a surface of the current collector foil. The positive electrode mixture layer includes a superficial layer portion and a deep layer portion. The superficial layer portion opposes the negative electrode via the separator. The deep layer portion is disposed between the superficial layer portion and the current collector foil. The superficial layer portion contains positive electrode active material particles having an average particle diameter larger than an average particle diameter of positive electrode active material particles contained in the deep layer portion. A space ratio between the positive electrode active material particles in (Continued)

the superficial layer portion is lower than a space ratio between the positive electrode active material particles in the deep layer portion.

6 Claims, 7 Drawing Sheets

(51) Int. Cl.
*H01M 4/139* (2010.01)
*H01M 4/505* (2010.01)
*H01M 4/525* (2010.01)
*H01M 10/0525* (2010.01)
*H01M 10/0587* (2010.01)
*H01M 4/02* (2006.01)

(52) U.S. Cl.
CPC ........... *H01M 4/505* (2013.01); *H01M 4/525* (2013.01); *H01M 10/0525* (2013.01); *H01M 10/0587* (2013.01); *H01M 2004/021* (2013.01); *H01M 2004/028* (2013.01)

(56) References Cited

U.S. PATENT DOCUMENTS

| | | |
|---|---|---|
| 2006/0019151 A1 | 1/2006 | Imachi et al. |
| 2009/0169986 A1 | 7/2009 | Fukunaga et al. |
| 2011/0168550 A1* | 7/2011 | Wang .................... H01M 4/131 204/290.01 |
| 2012/0251878 A1 | 10/2012 | Ueki et al. |
| 2013/0149604 A1 | 6/2013 | Fujiki et al. |
| 2018/0097255 A1 | 4/2018 | Jung et al. |

FOREIGN PATENT DOCUMENTS

| | | |
|---|---|---|
| JP | 2008-198596 A | 8/2008 |
| JP | 2009-026599 A | 2/2009 |
| JP | 2009-163942 A | 7/2009 |
| JP | 2011-009203 A | 1/2011 |
| JP | 5002872 * | 8/2012 |
| JP | 2013-114882 A | 6/2013 |
| JP | 2013-239302 A | 11/2013 |
| JP | 2016-009651 A | 1/2016 |
| JP | 2016-510941 A | 4/2016 |
| JP | 2017-157529 A | 9/2017 |
| JP | 2018-507528 A | 3/2018 |
| WO | 2011/036797 A1 | 3/2011 |
| WO | 2014/149766 A1 | 9/2014 |

OTHER PUBLICATIONS

Extended European Search Report dated Jul. 15, 2022 for European Patent Application No. 19884727.9.
Japanese Office Action issued on May 23, 2023 for Japanese Patent Application No. 2022-074948.

* cited by examiner

LITHIUM ION SECONDARY BATTERY AND METHOD FOR MANUFACTURING SAME

CROSS REFERENCE TO RELATED APPLICATIONS

This application is a continuation of U.S. application Ser. No. 17/292,293, filed May 7, 2021, which is a national phase application of International Application No. PCT/JP2019/042865, filed Oct. 31, 2019, which claims the benefit of priority from Japanese Application No. 2018-212635, filed Nov. 13, 2018, the entire contents of which are incorporated herein by reference.

TECHNICAL FIELD

The present disclosure relates to a lithium ion secondary battery and a method for manufacturing the same.

BACKGROUND ART

Conventionally, there has been known an invention relating to a positive electrode plate and a lithium ion secondary battery that includes the positive electrode plate (see Patent Literature 1 below). The invention disclosed in Patent Literature 1 has an object to provide a positive electrode plate that can ensure battery capacity while decreasing a lithium ion diffusion resistance in the use in a lithium ion secondary battery (see paragraph 0005 and the like in the literature). To achieve this object, Patent Literature 1 discloses an invention relating to a positive electrode plate that has the following configuration.

The positive electrode plate includes a metal foil that has a first principal surface and a second principal surface and a laminated active material layer formed on at least any one of the first principal surface or the second principal surface, and a plurality of positive electrode active material layers containing positive electrode active material particles formed of a lithium compound are laminated in the laminated active material layer. The laminated active material layer has a uniform content rate of the positive electrode active material particles viewed in the lamination direction, and the smaller average particle diameter of the contained positive electrode active material particles the positive electrode active material layer has, the upper layer the positive electrode active material layer is disposed in (see claim 1 and the like in the literature).

With this configuration, the lithium ion diffusion resistance can be decreased in the upper layer of the positive electrode plate, and decrease in battery capacity can be avoided while reducing the lithium ion diffusion resistance to decrease an internal resistance of the battery, thereby allowing the ensured capacity (see paragraph 0007 and the like in the literature). When the positive electrode plate is used in the battery, increase in battery internal resistance value over time can be suppressed even when charge and discharge is repeated (see paragraph 0008 and the like in the literature).

CITATION LIST

Patent Literature

Patent Literature 1: JP 2009-026599 A

SUMMARY OF INVENTION

Technical Problem

In the above-described conventional positive electrode plate, as described above, the positive electrode active material layer having the smaller average particle diameter of the contained positive electrode active material particles is disposed in the upper layer. In addition, in a lithium ion secondary battery using the positive electrode plate, the positive electrode active material layer that is disposed in the upper layer of the positive electrode plate and has the small average particle diameter of the contained positive electrode active material particles is opposed to a negative electrode plate via a separator (see paragraph 0027, FIG. 3, and the like in the literature). The conventional lithium ion secondary battery having such a configuration has the following problems.

The positive electrode active material layer in the upper layer of the positive electrode plate opposing the negative electrode plate via the separator increases in intercalation and deintercalation of lithium ions due to charge/discharge reaction of the battery compared with the positive electrode active material layer in the lower layer. However, for the positive electrode active material particles, cracking of the positive electrode active material particles easily occurs due to the intercalation and the deintercalation of the lithium ions as the average particle diameter relatively decreases. When the cracking of the positive electrode active material particles occurs, the internal resistance value of the battery possibly increases, or the battery capacity possibly decreases.

The present disclosure provides a lithium ion secondary battery that is excellent in durability and increased in capacity compared with the conventional one, and a method for manufacturing the same.

Solution to Problem

An aspect of the disclosure is a lithium ion secondary battery that includes a positive electrode, a negative electrode, and a separator. The positive electrode includes a positive electrode current collector foil and a positive electrode mixture layer disposed on a surface of the positive electrode current collector foil. The positive electrode mixture layer includes a superficial layer portion and a deep layer portion, the superficial layer portion opposes the negative electrode via the separator, and the deep layer portion is disposed between the superficial layer portion and the positive electrode current collector foil. The superficial layer portion contains positive electrode active material particles having an average particle diameter larger than an average particle diameter of positive electrode active material particles contained in the deep layer portion. A space ratio between the positive electrode active material particles in the superficial layer portion is lower than a space ratio between the positive electrode active material particles in the deep layer portion.

Advantageous Effects of Invention

The one aspect of the present disclosure can provide the lithium ion secondary battery that is excellent in durability and increased in capacity compared with the conventional one.

DESCRIPTION OF EMBODIMENTS

The following describes one embodiment of a lithium ion secondary battery and a method for manufacturing the same according to the present disclosure with reference to the drawings.

Figure 1:
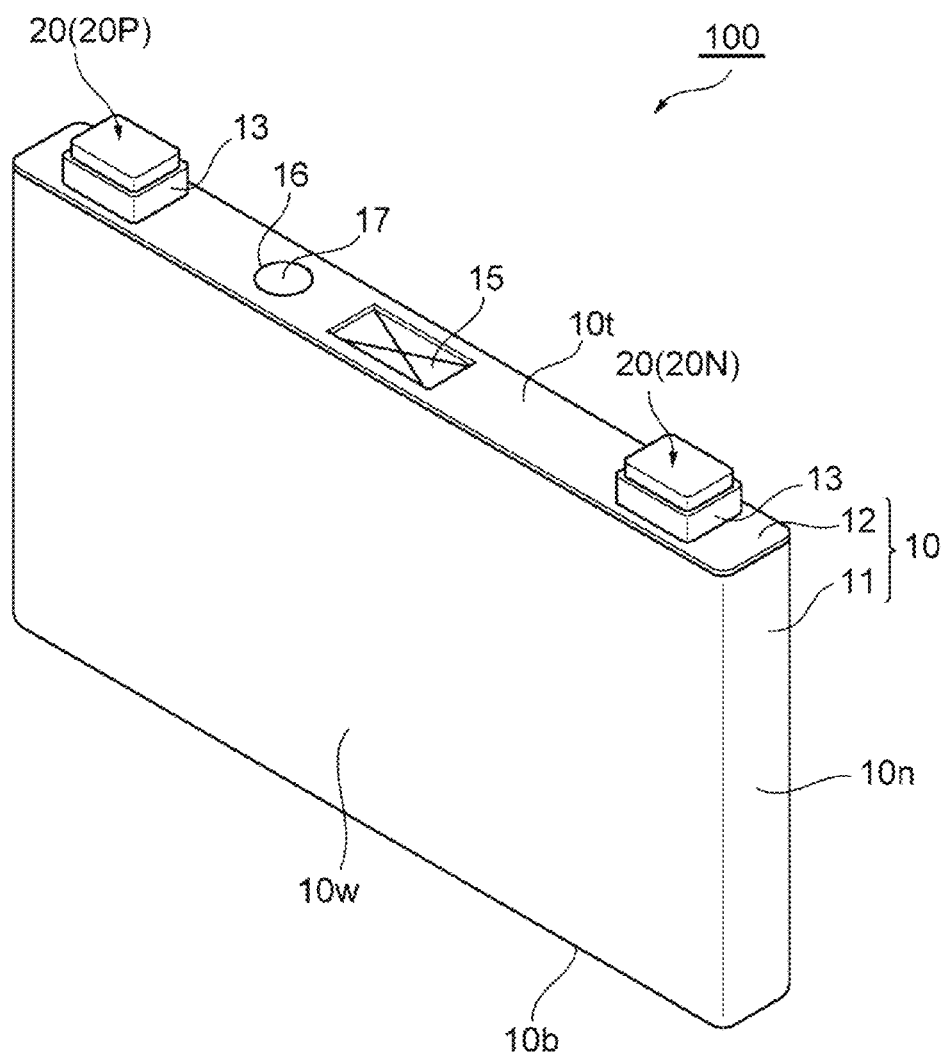
FIG. 1 is a perspective view of a lithium ion secondary battery according to one embodiment of this disclosure.
Figure 2:
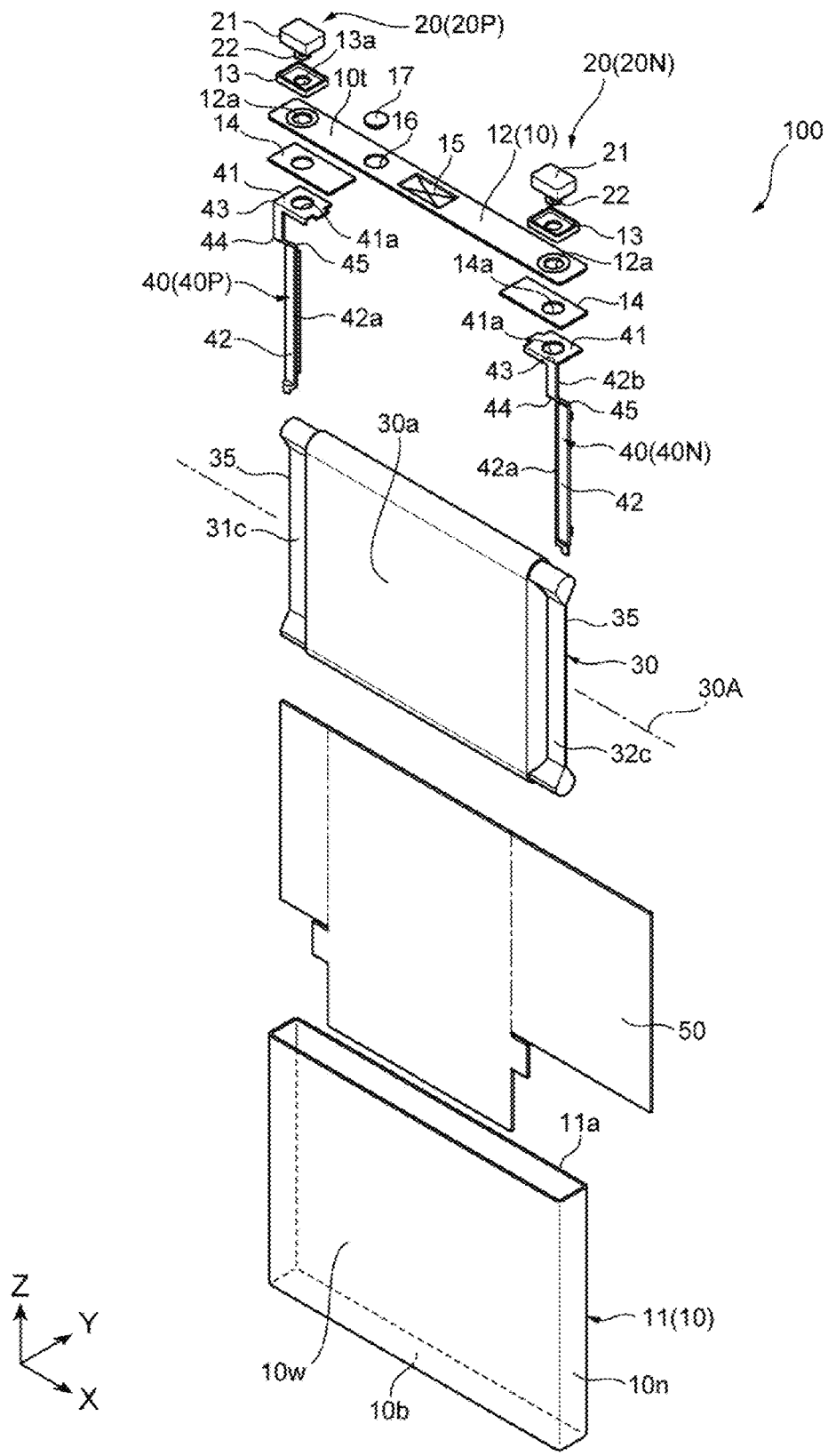
FIG. 2 is an exploded perspective view of the lithium ion secondary battery illustrated in FIG. 1.
Figure 3:
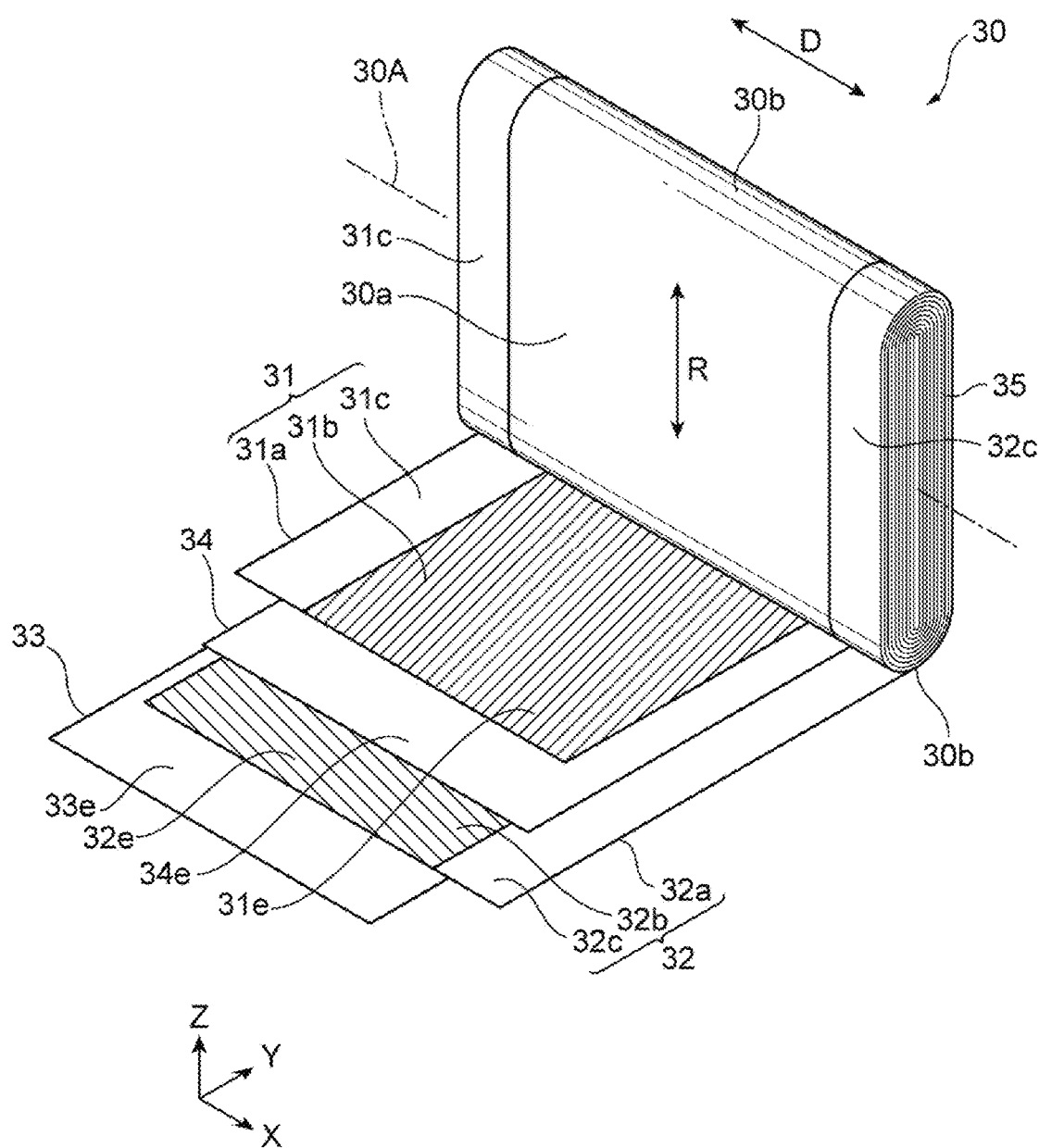
FIG. 3 is an exploded perspective view of a wound body of the lithium ion secondary battery illustrated in FIG. 2.
Figure 4:
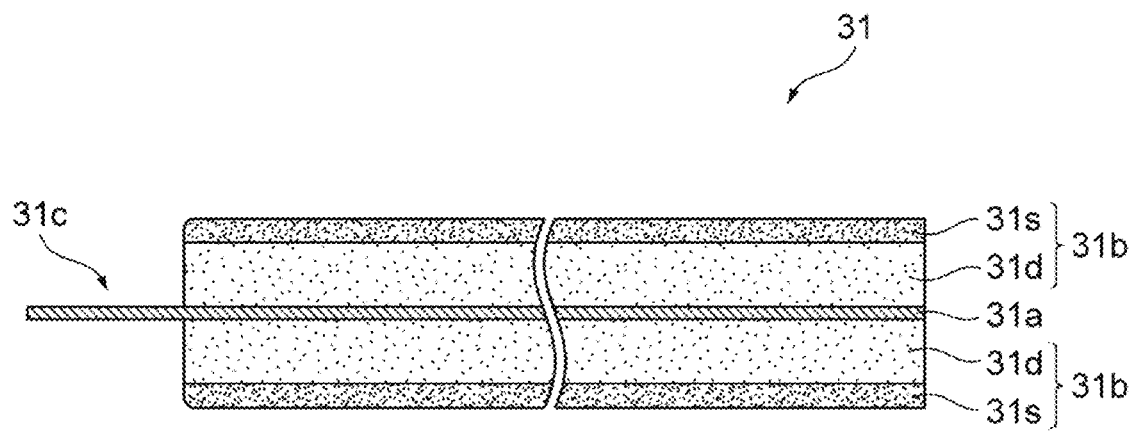
FIG. 4 is a schematic cross-sectional view of a positive electrode constituting the wound body illustrated in FIG. 3.
Figure 5:
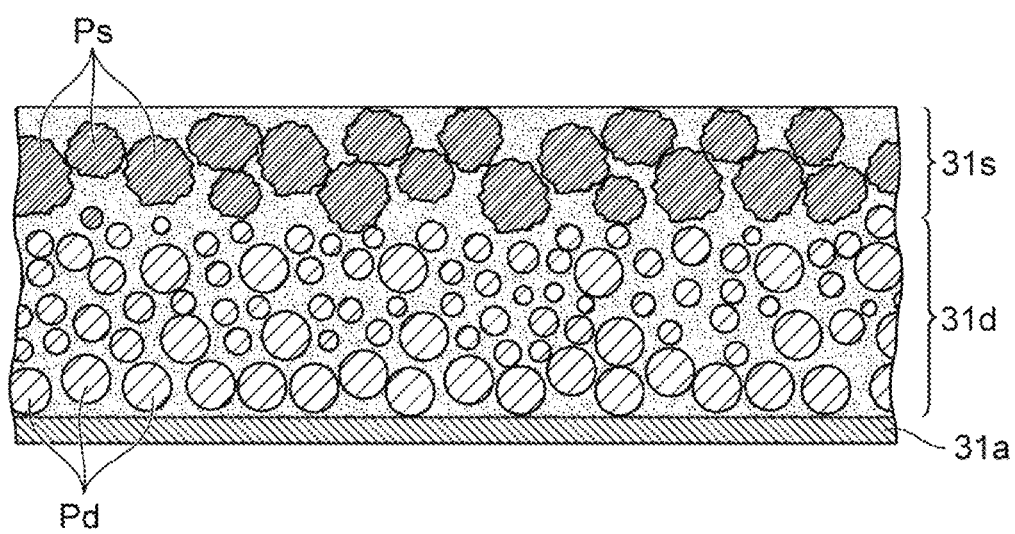
FIG. 5 is a schematic enlarged cross-sectional view of the positive electrode illustrated in FIG. 4.

FIG. 1 is a perspective view of a secondary battery 100 according to the one embodiment of the present disclosure. FIG. 2 is an exploded perspective view of the secondary battery 100 illustrated in FIG. 1. FIG. 3 is an exploded perspective view of a wound body 30 of the secondary battery 100 illustrated in FIG. 2. FIG. 4 is a schematic cross-sectional view of a positive electrode 31 constituting the wound body 30 illustrated in FIG. 3. FIG. 5 is a schematic enlarged cross-sectional view of the positive electrode 31 illustrated in FIG. 4.

The secondary battery 100 of this embodiment is a square secondary battery used for an electric storage device of, for example, an electric vehicle (EV) and a hybrid electric vehicle (HEV). More specifically, the secondary battery 100 is, for example, a square lithium ion secondary battery. For such a secondary battery 100, an increased capacity and an improved durability against high current input/output have been desired. While the details will be described later, the secondary battery 100 of this embodiment has the following configuration.

The secondary battery 100 is a lithium ion secondary battery, and includes the positive electrode 31, a negative electrode 32, and separators 33, 34. The positive electrode 31 includes a positive electrode current collector foil 31a and positive electrode mixture layers 31b disposed on surfaces of the positive electrode current collector foil 31a. The positive electrode mixture layers 31b include superficial layer portions 31s opposing the negative electrode 32 via the separators 33, 34, and deep layer portions 31d disposed between the superficial layer portions 31s and the positive electrode current collector foil 31a. The superficial layer portion 31s contains positive electrode active material particles Ps having an average particle diameter greater than an average particle diameter of positive electrode active material particles Pd contained in the deep layer portion 31d. A space ratio between the positive electrode active material particles Ps in the superficial layer portion 31s is lower than a space ratio between the positive electrode active material particles Pd in the deep layer portion 31d.

The following describes the configurations of the respective portions of the secondary battery 100 of this embodiment in detail. In the respective drawings, in some cases, the configurations of the respective portions of the secondary battery 100 are described using an XYZ orthogonal coordinate system including X-axis parallel to the width direction of the flat square secondary battery 100, Y-axis parallel to the thickness direction, and Z-axis parallel to the height direction. In the following description, directions of up-down and left-right are directions convenient for describing the configurations of the respective portions of the secondary battery 100 based on the drawings. They are not limited to the vertical direction or the horizontal direction.

The secondary battery 100 includes, for example, a battery container 10, external terminals 20, the wound body 30, current collector plates 40, and an insulating sheet 50. The battery container 10, for example, is a metallic container having a flat and rectangular box shape. The battery container 10 includes a pair of wide side surfaces 10w along the width direction (X-direction), a pair of narrow side surfaces 10n along the thickness direction (Y-direction), and elongated rectangular top surface 10t and bottom surface 10b. Among these wide side surfaces 10w, narrow side surfaces 10n, top surface 10t, and bottom surface 10b, the wide side surface 10w has the largest area.

The battery container 10 includes, for example, a flat square battery can 11 having opened one end in the height direction (Z-direction), and a rectangular-plate-shaped battery lid 12 that closes an opening 11a of the battery can 11. The wound body 30 as an electric storage element is internally inserted into the battery container 10 from the opening 11a of the battery can 11. In the battery container 10, the battery lid 12 is welded over the whole circumference of the opening 11a of the battery can 11 by, for example, laser beam welding, thus sealing the opening 11a of the battery can 11 with the battery lid 12.

On both ends in the longitudinal direction as the width direction (X-direction) of the secondary battery 100, the battery lid 12 is provided with through holes 12a through which the external terminals 20 are partially inserted. The battery lid 12 includes a gas discharge valve 15 at the center portion in the longitudinal direction. The gas discharge valve 15 is a portion having a slit formed by, for example, thinning a part of the battery lid 12 by presswork, and is integrally disposed with the battery lid 12. An increase of an internal pressure of the battery container 10 up to a predetermined pressure causes cleavage of the gas discharge valve 15 to discharge a gas inside the battery container 10, which reduces the internal pressure of the battery container 10 to ensure the safety of the secondary battery 100.

The battery lid 12 is provided with, for example, a liquid injection hole 16 between the through hole 12a and the gas discharge valve 15. The liquid injection hole 16 is provided to inject an electrolyte to an inside of the battery lid 12 and is sealed by joining a liquid injection plug 17 by, for example, laser beam welding after injecting the electrolyte. As a nonaqueous electrolyte to be injected into the battery container 10, for example, one obtained by dissolving lithium hexafluorophosphate ($LiPF_6$) in a mixed solution, in which ethylene carbonate and dimethyl carbonate are mixed with a volume ratio of 1:2, with a concentration of 1 mol/L can be used. Note that the nonaqueous electrolyte may contain a lithium electrolyte other than the lithium hexafluorophosphate to have a satisfactory ion conductivity, or an additive to maintain an electrode reaction activation in the electrolyte solvent.

The pair of external terminals 20 are separately disposed in the longitudinal direction of an outer surface of the battery lid 12, that is, the top surface 10t of the battery container 10, pass through the battery lid 12, and are connected to respective base portions 41 of the pair of current collector plates 40 inside the battery container 10. The external terminals 20 include a positive electrode external terminal 20P and a negative electrode external terminal 20N. A material of the positive electrode external terminal 20P is, for example, aluminum or an aluminum alloy. A material of the negative electrode external terminal 20N is, for example, copper or a copper alloy.

The external terminals 20 include, for example, joint portions 21 to be joined to busbars and connecting portions 22 to be connected to the current collector plates 40. The joint portions 21 have rectangular block shapes in approximately rectangular parallelepiped shapes and are disposed in the outer surface of the battery lid 12, that is, the top surface 10t of the battery container 10 via gaskets 13 having an electrical insulating property. The connecting portion 22 is a column-shaped or cylindrical-shaped portion extending in a direction passing through the battery lid 12 from a bottom surface of the joint portion 21 opposed to the battery lid 12.

The current collector plates 40 include the base portions 41 connected to the external terminals 20, extending portions 42 extending in a direction intersecting the base portions 41, and bent portions 43 disposed between joint portions 42a of the extending portions 42 joined to the wound body 30 and the base portions 41. The base portions 41 are disposed along an inner surface of the battery lid 12, and the extending portions 42 extend toward a direction perpendicular to the inner surface of the battery lid 12. The joint portion 42a of the extending portion 42 is joined by, for example, ultrasonic joining to a laminated portion 35 in which a positive electrode current collector portion 31c or a negative electrode current collector portion 32c of the wound body 30 is wound and flatly laminated.

The wound body 30 includes, for example, the positive electrode 31, the negative electrode 32, and the first separator 33 and the second separator 34 as insulators that insulate these electrodes. The wound body 30 is a wound electrode group having a configuration where the first separator 33, the positive electrode 31, the second separator 34, and the negative electrode 32 are laminated and wound. In the wound body 30, for example, the electrode wound around the innermost periphery and the outermost periphery is the negative electrode 32, and the first separator 33 is further wound around an outer periphery of the negative electrode 32 wound around the outermost periphery.

The negative electrode 32 includes a negative electrode current collector foil 32a, negative electrode mixture layers 32b formed on both its front and back surfaces, and the negative electrode current collector portion 32c as a portion where the negative electrode current collector foil 32a is exposed from the negative electrode mixture layers 32b. The negative electrode current collector portion 32c of the negative electrode 32 is disposed on one side in the width direction (X-direction) of the long strip-shaped negative electrode 32, that is, a winding axis direction D of the wound body 30. As the negative electrode current collector foil 32a, for example, a copper foil having a thickness of approximately 6 μm to approximately 12 μm can be used, and it is preferably an electrolytic copper foil of about 8 μm.

The negative electrode mixture layers 32b are formed by, for example, applying a slurry negative electrode mixture to both the front and back surfaces of the negative electrode current collector foil 32a excluding the negative electrode current collector portion 32c, and drying the applied negative electrode mixture and pressing them. Subsequently, the negative electrode current collector foil 32a on which the negative electrode mixture layers 32b are formed is appropriately cut, thereby allowing fabricating the negative electrode 32. The negative electrode mixture layers 32b have a thickness excluding the negative electrode current collector foil 32a of, for example, about 70 μm.

The slurry of the negative electrode mixture can be prepared, for example, as follows. A water solution of carboxymethyl cellulose (CMC) as a viscosity-adjusting agent is added to 100 parts by weight of a graphite carbon powder as a negative electrode active material, and mixed. 1 part by weight of styrene butadiene rubber (SBR) as a binder is further added to the mixture, pure water (water from which metal ions are removed by ion exchange) is further added as a dispersing solvent and mixed, and the obtained one can be used as the slurry of the negative electrode mixture.

When an insulating layer is formed on the surface of the negative electrode mixture layer 32b, an insulation slurry in which an insulating material is dispersed can be applied over the surface of the negative electrode mixture slurry applied over the surface of the negative electrode current collector foil 32a. Subsequently, the slurry of the negative electrode mixture and the insulation slurry are dried and pressed, thus allowing forming the negative electrode mixture layer 32b that includes the insulating layer on the surface. When the insulating layer is not formed on the surface of the negative electrode mixture layer 32b, it is preferred to use the separators 33, 34 that include layers containing inorganic materials, such as a ceramic layer, on the surface.

Note that the negative electrode active material included in the negative electrode mixture layer 32b is not limited to the above-described graphitic carbon. For example, as the negative electrode active material, amorphous carbon, natural graphite capable of insertion and desorption of lithium ions, various kinds of artificial graphite materials, a graphitic carbon material on which surface modification or surface reforming is performed, a carbonaceous material, such as coke, a compound of Si, Sn, and the like (for example, SiO and $TiSi_2$), or a composite material of these substances may be used. A particle shape of the negative electrode active material is not especially limited and may be a scaly shape, a spherical shape, a fiber shape, a lump shape, and the like. Among them, a negative electrode active material containing particles formed in spherical shapes as a main component is preferably used.

The positive electrode 31 includes a positive electrode current collector foil 31a as a positive electrode current collector, positive electrode mixture layers 31b formed on both its front and back surfaces, and the positive electrode current collector portion 31c as a portion where the positive electrode current collector foil 31a is exposed from the positive electrode mixture layers 31b. The positive electrode current collector portion 31c of the positive electrode 31 is disposed on one side on a side opposite to the negative electrode current collector portion 32c of the negative electrode 32 in the width direction (X-direction) of the long strip-shaped positive electrode 31, that is, the winding axis direction D of the wound body 30. As the positive electrode current collector foil 31a, for example, an aluminum foil having a thickness of approximately 10 μm to approximately 20 μm can be used, and it is preferably an aluminum foil having a thickness of about 15 μm. A foil material of the positive electrode current collector foil 31a is more preferably a foil material having a tensile strength of 250 $N/mm^2$ or more.

As described above, the positive electrode mixture layers 31b include the superficial layer portions 31s opposing the negative electrode mixture layers 32b of the negative electrode 32 via the separators 33, 34, and the deep layer portions 31d disposed between the superficial layer portions 31s and the positive electrode current collector foil 31a. That is, the deep layer portion 31d is disposed on the surface of the positive electrode current collector foil 31a, and the superficial layer portion 31s is disposed to cover the surface of the deep layer portion 31d. In other words, the deep layer portion 31d is disposed on the positive electrode current collector foil 31a, and the superficial layer portion 31s is disposed on the deep layer portion 31d.

While the details will be described later, the positive electrode mixture layers 31b are formed by, for example, laminating two types of slurry positive electrode mixtures containing two types of different positive electrode active material particles Ps, Pd, applying them to the surfaces of the positive electrode current collector foil 31a excluding the positive electrode current collector portion 31c, and drying the applied two types of positive electrode mixtures and pressing them. Subsequently, the positive electrode current collector foil 31a on which the positive electrode mixture layers 31b are formed is appropriately cut, thereby allowing fabricating the positive electrode 31. The positive electrode 31 may include an insulating layer on the surface similarly to the negative electrode 32.

The positive electrode mixture layers 31b have a thickness excluding the positive electrode current collector foil 31a of, for example, about 70 μm. As the slurry of the positive electrode mixture, for example, one obtained as follows can be used. 7 parts by weight of scaly graphite, acetylene black, or both of them as a conductive material and 3 parts by weight of PVDF as a binder are added to 100 parts by weight of layered nickel cobalt lithium manganate (chemical formula $Li(Ni_xCo_yMn_{1-x-y})O_2$) as the positive electrode active material, and N-methyl pyrrolidone (NMP) is further added as a dispersing solvent, thus mixing them.

In the chemical formula: $Li(Ni_xCo_yMn_{1-x-y})O_2$ of the layered nickel cobalt lithium manganate as the positive electrode active material, x and y are preferably in a range of $0.30<x\leq0.85$ and $0.18<y<0.40$. For example, as the positive electrode active material, the layered nickel cobalt lithium manganate indicated by the chemical formula: $Li(Ni_{0.6}Co_{0.2}Mn_{0.2})O_2$ can be used. The cobalt content of the positive electrode active material particles Ps contained in the superficial layer portion 31s is higher than, for example, the cobalt content of the positive electrode active material particles Pd contained in the deep layer portion 31d.

As described above, the average particle diameter of the positive electrode active material particles Ps contained in the superficial layer portion 31s is greater than the average particle diameter of the positive electrode active material particles Pd contained in the deep layer portion 31d. More specifically, the average particle diameter of the positive electrode active material particles Ps contained in the superficial layer portion 31s is, for example, 5 [μm] or more and 12 [μm] or less. In this case, the average particle diameter of the positive electrode active material particles Pd contained in the deep layer portion 31d is, for example, 3 [μm] or more and 8 [μm] or less.

For example, the average particle diameter of the positive electrode active material particles Ps contained in the superficial layer portion 31s can be set to 6.4 [μm], and the average particle diameter of the positive electrode active material particles Pd contained in the deep layer portion 31d can be set to 5.7 [μm]. The average particle diameters of the positive electrode active material particles Ps, Pd can be set to median diameters D50 of the positive electrode active material particles Ps, Pd measured by a particle size distribution measurement device using a laser diffraction scattering method and the like.

A tap density of the positive electrode active material particles Ps contained in the superficial layer portion 31s is higher than, for example, a tap density of the positive electrode active material particles Pd contained in the deep layer portion 31d. More specifically, the tap density of the positive electrode active material particles Ps contained in the superficial layer portion 31s is, for example, 2.0 [g/cm$^3$] or more and 2.8 [g/cm$^3$] or less. Meanwhile, the tap density of the positive electrode active material particles Pd contained in the deep layer portion 31d is, for example, 1.5 [g/cm$^3$] or more and 2.2 [g/cm$^3$] or less.

For example, the tap density of the positive electrode active material particles Ps contained in the superficial layer portion 31s can be set to 2.2 [g/cm$^3$], and the tap density of the positive electrode active material particles Pd contained in the deep layer portion 31d can be set to 2.0 [g/cm$^3$]. The tap densities of the positive electrode active material particles Ps, Pd can be measured by a measuring method according to Japanese Industrial Standards JIS Z 2512:2012 or JIS R 1628:1997.

As described above, the space ratio between the positive electrode active material particles Ps in the superficial layer portion 31s is lower than the space ratio between the positive electrode active material particles Pd in the deep layer portion 31d. More specifically, the space ratio between the positive electrode active material particles Ps in the superficial layer portion 31s is, for example, 25 [%] or more and 14 [%] or less. In this case, the space ratio between the positive electrode active material particles Pd in the deep layer portion 31d is, for example, 28 [%] or more and 15 [%] or less. The space ratio between the positive electrode active material particles Ps and the space ratio between the positive electrode active material particles Pd can be controlled by, for example, adjusting the combined amount of the positive electrode active material particles Ps, Pd, an addition rate of the solvent, or the like in the slurry as the material of the superficial layer portion 31s and the deep layer portion 31d.

Here, the space ratios of the positive electrode active material particles Ps, Ps are ratios of space between the positive electrode active material particles Ps, Ps in the positive electrode active material powder as an aggregation of the positive electrode active material particles Ps, Ps. The space ratios of the positive electrode active material particles Ps, Ps can be measured by, for example, an optical method in which a microscopy of a cross-sectional surface of a sample of the positive electrode mixture layer 31b is performed. More specifically, the space ratios of the positive electrode active material particles Ps, Ps can be obtained from, for example, areas of the positive electrode active material particles Ps, Ps per unit area in the cross-sectional surface of the sample of the superficial layer portion 31s and the deep layer portion 31d.

Note that the positive electrode active material included in the positive electrode mixture layer 31b is not limited to the above-described layered nickel cobalt lithium manganate. As the positive electrode active material, for example, another lithium manganate having a spinel crystal structure, and a lithium manganese composite oxide partially replaced or doped with a metallic element can be used. Additionally, as the positive electrode active material, a lithium cobaltate or a lithium titanate that has a layered crystal structure, and a lithium-metal composite oxide in which a part of these substances is replaced or doped with a metallic element may be used.

The binder used for the negative electrode mixture and the positive electrode mixture is not limited to SBR or PVDF. As the binder, for example, a polymer, such as polytetrafluoroethylene (PTFE), polyethylene, polystyrene, polybutadiene, butyl rubber, nitrile rubber, polysulfide rubber, nitrocellulose, cyanoethyl cellulose, various kinds of latexes, acrylonitrile, vinyl fluoride, vinylidene fluoride, propylene fluoride, chloroprene fluoride, and acrylic-based resin, and a mixture of these substances can be used.

The separators 33, 34 are made of, for example, porous polyethylene resin or polypropylene resin, or a composite resin thereof and are interposed between the positive electrode 31 and the negative electrode 32 to electrically insulate them. In addition, the separators 33, 34 are wound around an outside of the negative electrode 32 wound around the outermost periphery. Although the illustration is omitted, the wound body 30 may include a winding core for laminating the negative electrode 32, the first separator 33, the positive electrode 31, and the second separator 34 to wind them.

As the winding core, for example, one obtained by winding a resin sheet having a flexural rigidity higher than those of the positive electrode current collector foil 31a, the negative electrode current collector foil 32a, and the separators 33, 34 can be used. The wound body 30 is configured such that dimensions of the negative electrode mixture layers 32b in the winding axis direction D (X-direction) are larger than dimensions of the positive electrode mixture layers 31b while the positive electrode mixture layers 31b are always sandwiched between the negative electrode mixture layers 32b.

In the wound body 30, as illustrated in FIG. 3, each of the positive electrode current collector portion 31c of the positive electrode 31 and the negative electrode current collector portion 32c of the negative electrode 32 is wound to be laminated on one end and the other end in the winding axis direction D (X-direction). Furthermore, as illustrated in FIG. 2, each of the positive electrode current collector portion 31c and the negative electrode current collector portion 32c is flatly bundled and is joined to the joint portions 42a of the extending portions 42 of the current collector plates 40 by, for example, ultrasonic joining or resistance welding.

In the winding axis direction D (X-direction), dimensions of the separators 33, 34 are larger than the dimensions of the negative electrode mixture layers 32b. However, the separators 33, 34 have end portions each disposed at an inner position in the winding axis direction D (X-direction) with respect to end portions of the positive electrode current collector portion 31c and the negative electrode current collector portion 32c. Therefore, this does not obstruct bundling the positive electrode current collector portion 31c and the negative electrode current collector portion 32c and joining them to the joint portions 42a of the extending portions 42 of a positive electrode current collector plate 40P and a negative electrode current collector plate 40N, respectively.

The base portions 41 of the current collector plates 40 are secured to the battery lid 12 via plate-shaped insulating members 14 and electrically connected to the external terminals 20. More specifically, the connecting portions 22 of the external terminals 20 are inserted through, for example, through holes 13a of the gaskets 13, the through holes 12a of the battery lid 12, through holes 14a of the insulating members 14, and through holes 41a of the base portions 41 of the current collector plates 40. The connecting portions 22 of the external terminals 20 are plastically deformed to be caulked while the distal ends are radially expanded on lower surfaces of the base portions 41 of the current collector plates 40.

Thus, the external terminals 20 and the current collector plates 40 are secured in a state of being electrically connected to one another and being electrically insulated from the battery lid 12 via the gaskets 13 and the insulating members 14, thus being assembled as a lid assembly. A material of the gasket 13 and the insulating member 14 is, for example, a resin having an electrical insulating property, such as polybutylene terephthalate, polyphenylene sulfide, and perfluoroalkoxy fluororesin.

In the assembled lid assembly, the joint portions 42a of the extending portions 42 of the current collector plates 40 are joined to the respective laminated portions 35 of the positive electrode current collector portion 31c and the negative electrode current collector portion 32c of the wound body 30. Thus, the positive electrode 31 and the negative electrode 32, which constitute the wound body 30, are electrically connected to the external terminals 20 via the current collector plates 40. The wound body 30 is joined to the current collector plates 40, thereby being secured to the battery lid 12 via the current collector plates 40 and electrically connected to the external terminals 20. In this state, the wound body 30 is covered with the resin insulating sheet 50 having an electrical insulating property, and inserted into the battery can 11 from the opening 11a of the battery can 11.

The insulating sheet 50 is formed of one sheet or a plurality of film members made of a material, for example, a synthetic resin, such as polypropylene. The insulating sheet 50 has dimensions and a shape that can cover approximately the whole wound body 30, to which the current collector plates 40 have been joined, together with the current collector plates 40. The insulating sheet 50 is interposed between the wound body 30 with the current collector plates 40 and the battery can 11, so as to electrically insulate therebetween. The wound body 30 and the current collector plate 40 may be covered with a bag-shaped insulating film instead of the insulating sheet 50.

The wound body 30 is inserted into the battery can 11 from one curving portion 30b so as to have the winding axis direction D along the width direction (X direction) of the secondary battery 100, and disposed to have the other curving portion 30b to be opposed to the battery lid 12. Subsequently, as described above, the battery lid 12 is joined to the opening 11a of the battery can 11 over the whole circumference to constitute the battery container 10. Subsequently, the electrolyte is injected into the battery container 10 via the liquid injection hole 16, and the liquid injection hole 16 is sealed by joining the liquid injection plug 17. At this time, appropriately adjusting a pressure inside the battery container 10 and a pressure outside the battery container 10 accelerates the replacement of the air with the electrolyte in the wound body 30, thus allowing efficiently injecting the electrolyte into the battery container 10.

With the above-described configuration, in the secondary battery 100, the external terminal 20 is connected to an external device via a not illustrated busbar joined to the external terminal 20. The secondary battery 100 is charged by supplying an electric power to the positive electrode 31 and the negative electrode 32 of the wound body 30 via the external terminal 20 and the current collector plate 40. The charged secondary battery 100 can supply the electric power to the external device from the positive electrode 31 and the negative electrode 32 of the wound body 30 via the current collector plate 40 and the external terminal 20.

The following describes actions of the secondary battery 100 of this embodiment based on the comparison with a conventional lithium ion secondary battery that includes a conventional positive electrode plate.

In the conventional positive electrode plate, as described above, the smaller average particle diameter of the contained positive electrode active material particles the positive electrode active material layer has, the upper layer the positive electrode active material layer is disposed in. In the lithium ion secondary battery using this positive electrode plate, the positive electrode active material layer that is disposed in the upper layer of the positive electrode plate and has the small average particle diameter of the contained positive electrode active material particles is opposed to the negative electrode plate via the separator. The positive electrode active material layer in the upper layer of the positive electrode plate opposing the negative electrode plate via the separator increases in intercalation and deintercalation of lithium ions due to charge/discharge reaction of the battery compared with the positive electrode active material layer in the lower layer.

However, for the positive electrode active material particles, cracking of the positive electrode active material particles easily occurs due to the intercalation and the deintercalation of the lithium ions as the average particle diameter relatively decreases. Therefore, in this conventional lithium ion battery, in the positive electrode active material layer of the upper layer, cracking occurs in the positive electrode active material particles, thus possibly increasing the internal resistance value of the battery or decreasing the battery capacity.

An on-vehicle secondary battery used for an electric storage device of a vehicle, such as an EV and an HEV, is desired to have further high output power. Furthermore, the on-vehicle secondary battery is desired to have an extended discharge power duration so as to allow extending the travel distance of the vehicle compared with the conventional one.

In contrast, as described above, the secondary battery 100 of this embodiment is a lithium ion secondary battery, and includes the positive electrode 31, the negative electrode 32, and the separators 33, 34. The positive electrode 31 includes the positive electrode current collector foil 31a and the positive electrode mixture layers 31b disposed on the surfaces of the positive electrode current collector foil 31a. The positive electrode mixture layers 31b include the superficial layer portions 31s opposing the negative electrode 32 via the separators 33, 34, and the deep layer portions 31d disposed between the superficial layer portions 31s and the positive electrode current collector foil 31a. The average particle diameter of the positive electrode active material particles Ps contained in the superficial layer portion 31s is greater than the average particle diameter of the positive electrode active material particles Pd contained in the deep layer portion 31d. The space ratio between the positive electrode active material particles Ps in the superficial layer portion 31s is lower than the space ratio between the positive electrode active material particles Pd in the deep layer portion 31d.

Thus, since the average particle diameter of the positive electrode active material particles Ps contained in the superficial layer portion 31s is greater than the average particle diameter of the positive electrode active material particles Pd contained in the deep layer portion 31d in the positive electrode mixture layer 31b, the cracking of the positive electrode active material particles Ps in the superficial layer portion 31s is suppressed. That is, the relatively large average particle diameter of the positive electrode active material particles Ps allows suppressing the cracking caused by the intercalation and the deintercalation of the lithium ions due to charge/discharge reaction in the secondary battery 100.

That is, the cracking of the positive electrode active material particles Ps in the positive electrode mixture layers 31b, which are opposed to the negative electrode 32 via the separators 33, 34 and increased in intercalation and deintercalation of the lithium ions compared with the positive electrode active material particles Pd in the deep layer portion 31d, can be suppressed. Accordingly, the decrease in capacity of the secondary battery 100 can be suppressed, thereby allowing suppressing the increase in internal resistance of the secondary battery 100 to achieve the higher output power of the secondary battery 100.

Furthermore, by a shield effect in which the positive electrode active material particles Ps in the superficial layer portion 31s having the relatively high durability protect the positive electrode active material particles Pd in the deep layer portion 31d having the relatively low durability, the cracking of the positive electrode active material particles Pd in the deep layer portion 31d can be avoided. Accordingly, the secondary battery 100 of this embodiment can provide the lithium ion secondary battery that is excellent in durability and increased in capacity compared with the conventional lithium ion secondary battery.

The average particle diameter of the positive electrode active material particles Pd contained in the deep layer portion 31d is smaller than that of the positive electrode active material particles Ps contained in the superficial layer portion 31s. Therefore, by the positive electrode active material particles Pd that are contained in the deep layer portion 31d and have the relatively small average particle diameter and high capacity density, the decrease in capacity and the decrease in output power of the secondary battery 100 are avoided, thus allowing achieving an increased capacity and a higher output power of the secondary battery 100. That is, the secondary battery 100 of this embodiment can provide the lithium ion secondary battery in which the capacity and the output power are increased by the relatively small positive electrode active material particles Pd contained in the deep layer portion 31d while the durability of the secondary battery 100 is improved by the relatively large positive electrode active material particles Ps contained in the superficial layer portion 31s.

Furthermore, since the space ratio between the positive electrode active material particles Ps in the superficial layer portion 31s is lower than the space ratio between the positive electrode active material particles Pd in the deep layer portion 31d, the positive electrode active material particles Ps are densely filled in the superficial layer portion 31s, thus avoiding missing the positive electrode active material particles Ps. Therefore, a local deterioration of the positive electrode mixture layer 31b caused by opening of a large hole in the superficial layer portion 31s is avoided, and the shield effect of the positive electrode active material particles Ps in the superficial layer portion 31s is sustained for a longer period, thus allowing improving the durability of the secondary battery 100.

Accordingly, the use of the secondary battery 100 of this embodiment for the electric storage device of the vehicle allows extending the discharge power duration in addition to the higher output power of the vehicle, such as an EV and an HEV, thereby allowing extending the travel distance of the vehicle compared with the conventional one.

In the secondary battery 100 of this embodiment, as described above, for example, the tap density of the positive electrode active material particles Ps contained in the superficial layer portion 31s is higher than the tap density of the positive electrode active material particles Pd contained in the deep layer portion 31d.

With this configuration, as described above, the space ratio between the positive electrode active material particles Ps in the superficial layer portion 31s can be lowered compared with the space ratio between the positive electrode active material particles Pd in the deep layer portion 31d. That is, when the tap density of the positive electrode active material particles Ps is higher than the tap density of the positive electrode active material particles Pd, the positive electrode active material particles Ps in the superficial layer portion 31s can be disposed with the density higher than that of the positive electrode active material particles Pd in the deep layer portion 31d, thereby avoiding missing the positive electrode active material particles Ps in the superficial layer portion 31s.

In the secondary battery 100 of this embodiment, for example, the cobalt content of the positive electrode active material particles Ps contained in the superficial layer portion 31s is higher than the cobalt content of the positive electrode active material particles Pd contained in the deep layer portion 31d.

With this configuration, in the positive electrode active material particles Ps contained in the superficial layer portion 31s, the layered structure can be more stably kept. Stably keeping the layered structure of the positive electrode active material particles Ps allows suppressing, for example, a cation mixing in which Ni is mixed in Li site. Therefore, excellent charge/discharge cycle characteristics can be obtained, thus allowing improving the durability of the positive electrode active material particles Ps contained in the superficial layer portion 31s.

In the secondary battery 100 of this embodiment, as described above, for example, the tap density of the positive electrode active material particles Ps contained in the superficial layer portion 31s is 2.0 [g/cm$^3$] or more and 2.8 [g/cm$^3$] or less. In this case, the tap density of the positive electrode active material particles Pd contained in the deep layer portion 31d is, for example, 1.5 [g/cm$^3$] or more and 2.2 [g/cm$^3$] or less.

With this configuration, fluidities of the positive electrode active material particles Ps, Pd can be ensured, thus allowing facilitating the handling of the positive electrode active material particles Ps, Pd. The space ratio between the positive electrode active material particles Ps in the superficial layer portion 31s can be more effectively lowered compared with the space ratio between the positive electrode active material particles Pd in the deep layer portion 31d. Accordingly, missing of the positive electrode active material particles Ps in the superficial layer portion 31s can be more effectively avoided.

In the secondary battery 100 of this embodiment, for example, as described above, the average particle diameter of the positive electrode active material particles Ps contained in the superficial layer portion 31s is 5 [μm] or more and 12 [μm] or less. In this case, the average particle diameter of the positive electrode active material particles Pd contained in the deep layer portion 31d is, for example, 3 [μm] or more and 8 [μm] or less.

With this configuration, as described above, the cracking of the positive electrode active material particles Ps contained in the superficial layer portion 31s is suppressed, and the cracking of the positive electrode active material particles Pd in the deep layer portion 31d is avoided by the above-described shield effect, thus allowing sufficiently improving the durability of the secondary battery 100. In addition, the capacity density of the positive electrode active material particles Pd contained in the deep layer portion 31d is improved, thus allowing more effectively achieving the increased capacity and the higher output power of the secondary battery 100. Accordingly, for example, high requirements for the on-vehicle secondary battery can be satisfied.

In the secondary battery 100 of this embodiment, for example as described above, the space ratio of the positive electrode active material particles Ps in the superficial layer portion 31s is 25 [%] or less and 14 [%] or more. In this case, the space ratio of the positive electrode active material particles Pd in the deep layer portion 31d is, for example, 28 [%] or less and 15 [%] or more.

With this configuration, the positive electrode active material particles Ps can be densely filled in the superficial layer portion 31s of the positive electrode mixture layer 31b, thus allowing avoiding the missing of the positive electrode active material particles Ps in the superficial layer portion 31s with more certainty. Therefore, it is avoided that the shield effect is locally lost due to the missing of the positive electrode active material particles Ps in the superficial layer portion 31s having the larger average particle diameter than the positive electrode active material particles Pd in the deep layer portion 31d, thus allowing effectively avoiding the local deterioration of the positive electrode mixture layer 31b. Accordingly, the positive electrode active material particles Pd in the deep layer portion 31d having the small average particle diameter compared with the positive electrode active material particles Ps in the superficial layer portion 31s can be protected by the shield effect of the positive electrode active material particles Ps in the superficial layer portion 31s.

As described above, this embodiment can provide the secondary battery 100 as the lithium ion secondary battery that is excellent in durability and increased in capacity compared with the conventional one.

Figure 6:
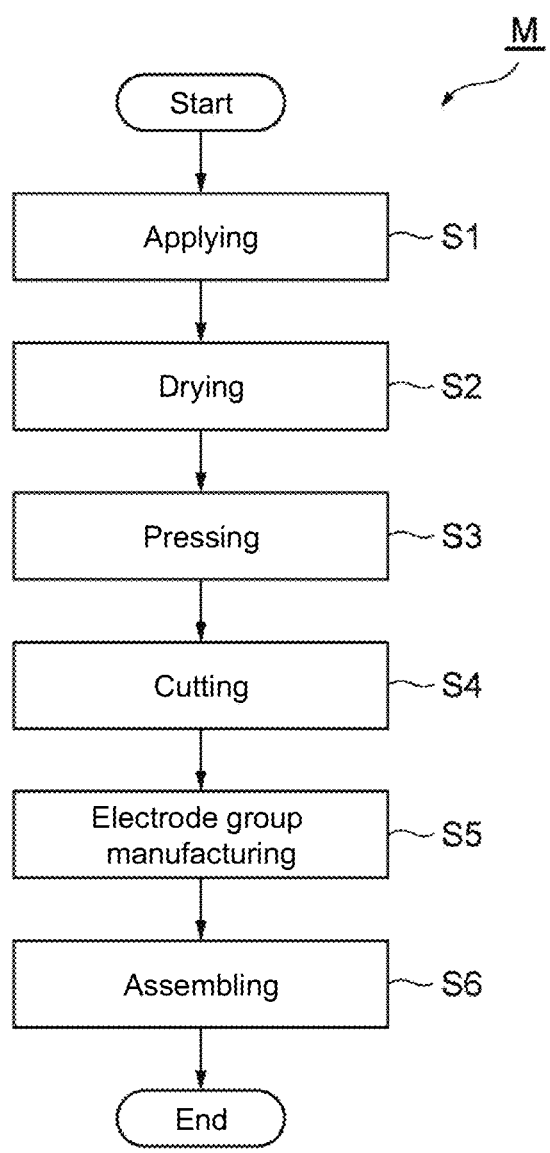
FIG. 6 is a flowchart of a method for manufacturing the lithium ion secondary battery according to the one embodiment of this disclosure.
Figure 7:
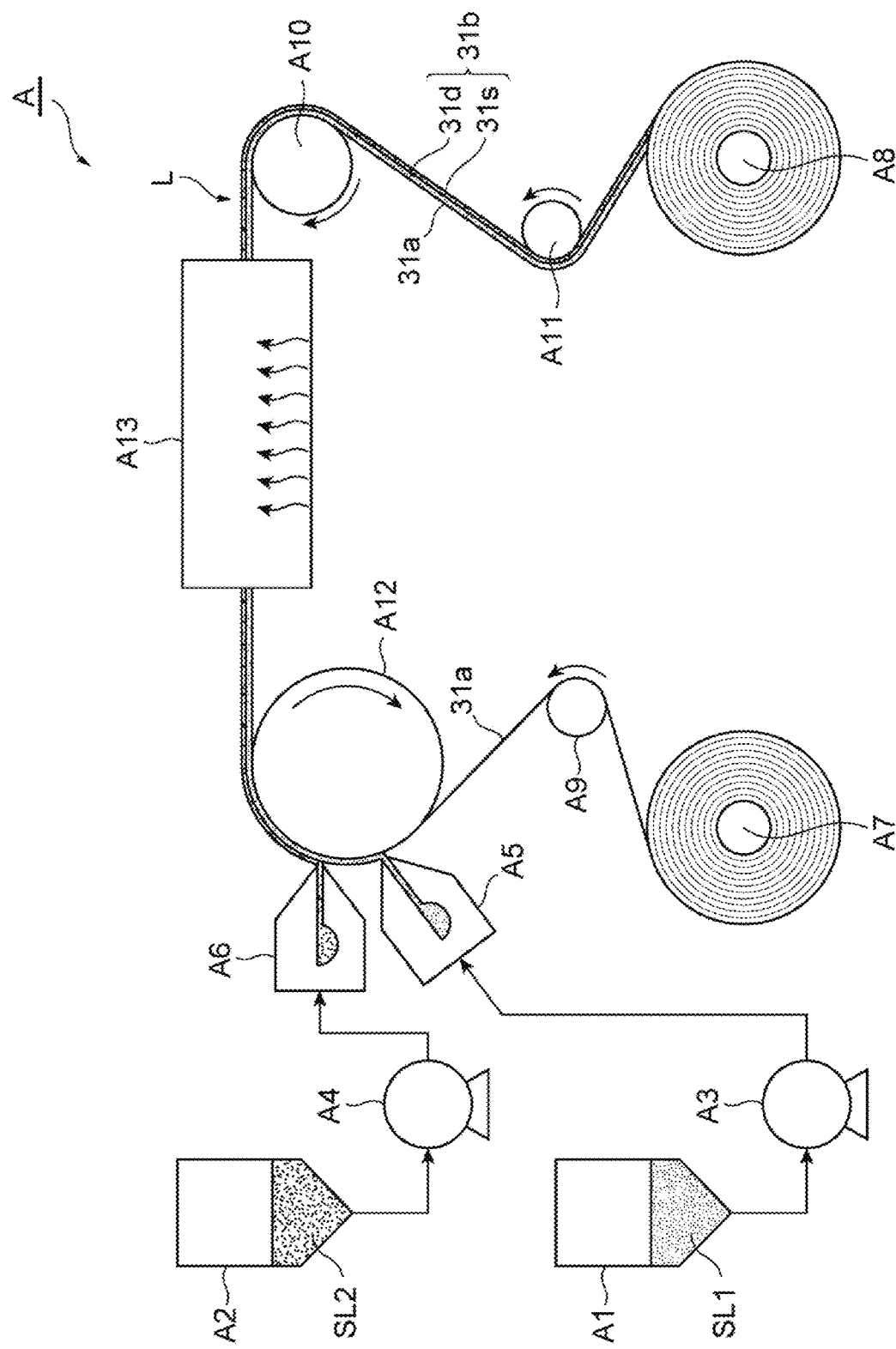
FIG. 7 is a schematic drawing of a manufacturing apparatus used in an applying step and a drying step illustrated in FIG. 6.

Next, with reference to FIG. 6 and FIG. 7, a description will be given of a manufacturing method M of the lithium ion secondary battery according to one embodiment of this disclosure. FIG. 6 is a flowchart illustrating steps of the manufacturing method M of the lithium ion secondary battery of this embodiment. FIG. 7 is a schematic diagram illustrating a part of a manufacturing apparatus A used for the manufacturing method M of the lithium ion secondary battery of this embodiment.

The manufacturing method M of the lithium ion secondary battery of this embodiment is a method, for example, for manufacturing the secondary battery 100 described above. More specifically, the manufacturing method M of the lithium ion secondary battery of this embodiment is a method for manufacturing the lithium ion secondary battery in which the positive electrode 31 is opposed to the negative electrode 32 via the separators 33, 34. The manufacturing method M of the lithium ion secondary battery of this embodiment is characterized by a manufacturing process of the positive electrode 31. Therefore, the following describes the manufacturing process of the positive electrode 31 in detail, and the description of other processes will be appropriately omitted.

As illustrated in FIG. 6, the manufacturing method M of the lithium ion secondary battery of this embodiment includes an applying step S1, a drying step S2, a pressing step S3, a cutting step S4, and an electrode group manufacturing step S5. In addition, the manufacturing method M of the lithium ion secondary battery of this embodiment includes, for example, an assembling step S6.

The manufacturing apparatus A illustrated in FIG. 7 is an apparatus used in, for example, the applying step S1 and the drying step S2. The manufacturing apparatus A includes, for example, a first slurry tank A1, a second slurry tank A2, pumps A3, A4, a first slit die A5, and a second slit die A6. The manufacturing apparatus A includes, for example, a supply roller A7, a collection roller A8, conveyance rollers A9, A10, and A11, a coating roller A12, and a dryer A13.

The first slurry tank A1 stores a first slurry SL1 containing the first positive electrode active material particles Pd. The second slurry tank A2 stores a second slurry SL2 containing the second positive electrode active material particles Ps. The first slurry SL1 is the material of the deep layer portion 31d, and the second slurry SL2 is the material of the superficial layer portion 31s. As the first slurry SL1 and the second slurry SL2, as described above, ones obtained by adding the conductive material, the binder, and the dispersing solvent to each of the positive electrode active material particles Pd and the positive electrode active material particles Ps and mixing them can be used.

The pump A3 is disposed to a channel of the first slurry SL1 between the first slurry tank A1 and the first slit die A5, and pressure-feeds the first slurry SL1 from the first slurry tank A1 to the first slit die A5. The pump A4 is disposed to a channel of the second slurry SL2 between the second slurry tank A2 and the second slit die A6, and pressure-feeds the second slurry SL2 from the second slurry tank A2 to the second slit die A6.

The first slit die A5 discharges the first slurry SL1 pressure-fed by the pump A3 from a slit, thus applying it over the surface of the positive electrode current collector foil 31a. The second slit die A6 is disposed rearward in a conveying direction of the positive electrode current collector foil 31a with respect to the first slit die A5, and applies the second slurry SL2 pressure-fed by the pump A4 over the surface of the first slurry SL1 applied over the surface of the positive electrode current collector foil 31a.

The supply roller A7 rotates while supporting the positive electrode current collector foil 31a wound in a roll shape on the outer periphery, thereby supplying the positive electrode current collector foil 31a. The collection roller A8 rotates, thereby winding the positive electrode current collector foil 31a with the positive electrode mixture layer 31b formed on the surface around the outer periphery and collecting it. The conveyance rollers A9, A10, and A11 convey the positive electrode current collector foil 31a supplied from the supply roller A7 to the coating roller A12, the dryer A13, and the collection roller A8.

The coating roller A12 rotates while supporting the positive electrode current collector foil 31a on the outer peripheral surface when the first slurry SL1 and the second slurry SL2 are applied over the positive electrode current collector foil 31a, thus conveying the positive electrode current collector foil 31a to the dryer A13. The dryer A13 heats the first slurry SL1 and the second slurry SL2 applied over the surface of the positive electrode current collector foil 31a, and dries them.

The applying step S1 includes, for example, a step of applying a slurry as a material of the positive electrode mixture layer 31b over the positive electrode current collector foil 31a constituting the positive electrode 31, and a step of applying a slurry as a material of the negative electrode mixture layer 32b over the negative electrode current collector foil 32a constituting the negative electrode 32. In this embodiment, the applying step S1 is characterized by the step of applying a slurry as a material of the positive electrode mixture layer 31b over the positive electrode current collector foil 31a. Therefore, the following describes the manufacturing process of the positive electrode 31, and the description of the manufacturing process of the negative electrode 32 will be omitted.

In this embodiment, the applying step S1 includes a step of applying the first slurry SL1 containing the first positive electrode active material particles Pd over the surface of the positive electrode mixture layer 31b and applying the second slurry SL2 containing the second positive electrode active material particles Ps over the surface of the first slurry SL1. Here, the second positive electrode active material particles Ps contained in the second slurry SL2 as the material of the superficial layer portion 31s have the larger average particle diameter than the first positive electrode active material particles Pd contained in the first slurry SL1 as the material of the deep layer portion 31d. The second positive electrode active material particles Ps have the high tap density compared with the first positive electrode active material particles Pd.

More specifically, in the applying step S1, for example, the first slurry SL1 and the second slurry SL2 are applied over the positive electrode current collector foil 31a that is supplied from the supply roller A7, conveyed by the conveyance rollers A9, A10, and A11, and supported by the coating roller A12 in the manufacturing apparatus A. In more detail, the first slurry SL1 is pressure-fed by the pump A3 from the first slurry tank A1 to the first slit die A5. Subsequently, the first slurry SL1 is discharged from the slit of the first slit die A5, thereby applying the first slurry SL1 over the surface of the positive electrode current collector foil 31a.

Furthermore, the second slurry SL2 is pressure-fed by the pump A4 from the second slurry tank A2 to the second slit die A6. Subsequently, the second slurry SL2 is discharged from the slit for the second slurry SL2, thereby applying the second slurry SL2 over the surface of the first slurry SL1 applied over the surface of the positive electrode current collector foil 31a. That is, in the applying step S1, the second slurry SL2 is applied over the first slurry SL1 before drying.

In the applying step S1, for example, the first slurry SL1 and the second slurry SL2 are prepared such that the second slurry SL2 has a viscosity lower than a viscosity of the first slurry SL1. Accordingly, the second slurry SL2 applied over the first slurry SL1 quickly and smoothly spreads to cover the surface of the first slurry SL1, thereby uniformly coating the surface of the first slurry SL1 with the second slurry SL2.

Note that, in the applying step S1, for example, the first slurry SL1 and the second slurry SL2 are applied excluding both ends in the width direction of the strip-shaped positive electrode current collector foil 31a. In addition, while the first slurry SL1 and the second slurry SL2 are applied using the first slit die A5 and the second slit die A6 in the manufacturing apparatus A illustrated in FIG. 7, the manufacturing apparatus A is not limited to this configuration. For example, the first slurry SL1 and the second slurry SL2 laminated in advance may be simultaneously discharged from one slit die. After completing the applying step S1, the drying step S2 starts.

The drying step S2 is a step of drying the first slurry SL1 applied over the surface of the positive electrode current collector foil 31a and the second slurry SL2 applied over the surface of the first slurry SL1. In this step, the deep layer portion 31d containing the first positive electrode active material particles Pd is formed on the surface of the positive electrode current collector foil 31a, and the superficial layer portion 31s containing the second positive electrode active material particles Ps is formed on the surface of the deep layer portion 31d.

More specifically, in the drying step S2, for example, the positive electrode current collector foil 31a is conveyed by the conveyance rollers A9, A10, and A11 of the manufacturing apparatus A, thus sending the positive electrode current collector foil 31a with the first slurry SL1 and the second slurry SL2 applied over its surface into the dryer A13. For example, the dryer A13 heats the first slurry SL1 and the second slurry SL2 applied over the surface of the positive electrode current collector foil 31a to vaporize the solvent by the hot wind, thus simultaneously drying them. A device to suction and collect the vaporized solvent may be added to enhance the efficiency of the drying step S2.

At this time, fine gaps or voids are provided between the positive electrode active material particles Pd contained in the first slurry SL1, between the positive electrode active material particles Ps contained in the second slurry SL2, and between the particles of the conductive auxiliary agent. The gaps or the voids have the size in the close-packed arrangement determined by the average particle diameters of the positive electrode active material particles Pd and the positive electrode active material particles Ps. The gaps or the voids can be controlled by a mixing ratio of the positive electrode active material particles Pd and the positive electrode active material particles Ps, the conductive auxiliary agent, the solvent, and the like in preparing the first slurry SL1 and the second slurry SL2.

In FIG. 7, the positive electrode mixture layer 31b including the deep layer portion 31d and the superficial layer portion 31s is formed by applying the first slurry SL1 and the second slurry SL2 over only one surface of the positive electrode current collector foil 31a. Subsequently, for example, the positive electrode current collector foil 31a with the positive electrode mixture layer 31b formed on its one surface is supported to the outer periphery of the supply roller A7, and the first slurry SL1 and the second slurry SL2 are applied over the other surface of the positive electrode current collector foil 31a and dried, thus allowing forming the positive electrode mixture layers 31b on both surfaces of the positive electrode current collector foil 31a. After completing the drying step S2, the pressing step S3 starts.

The pressing step S3 is a step of pressurizing a laminated body L in which the deep layer portion 31d is disposed on the surface of the positive electrode current collector foil 31a and the superficial layer portion 31s is disposed on the surface of the deep layer portion 31d through the drying step S2. In the pressing step S3, for example, the laminated body L is sandwiched between a pair of press rollers and pressed. After completing the pressing step S3, the cutting step S4 starts.

The cutting step S4 is a step of cutting the laminated body L that has undergone the pressing step S3 to obtain the positive electrode 31 that includes the positive electrode mixture layer 31b including the superficial layer portion 31s and the deep layer portion 31d. In the cutting step S4, for example, the laminated body L in which the positive electrode mixture layer 31b is disposed on the surface of the positive electrode current collector foil 31a excluding both ends in the width direction of the strip-shaped positive electrode current collector foil 31a is cut at the center in the width direction of the positive electrode current collector foil 31a. Accordingly, as illustrated in FIG. 3 and FIG. 4, the positive electrode 31 that includes the positive electrode current collector portion 31c on one end in the width direction is obtained. After completing the cutting step S4, the electrode group manufacturing step S5 starts.

The electrode group manufacturing step S5 is a step of causing the positive electrode 31 to oppose the negative electrode 32 via the separators 33, 34, and causing the superficial layer portion 31s of the positive electrode mixture layer 31b to oppose the negative electrode 32 via the separators 33, 34. More specifically, in the electrode group manufacturing step S5, the separator 33 and the separator 34 are wound around a rotation shaft of a winding machine, and the positive electrode 31 and the negative electrode 32 are each sandwiched between the separators 33, 34 and wound.

Accordingly, as illustrated in FIG. 3, 30 in which the electrode wound around the innermost periphery and the outermost periphery is the negative electrode 32 and the first separator 33 is further wound around the outer periphery of the negative electrode 32 wound around the outermost periphery can be manufactured. Note that, in the electrode group manufacturing step S5, a winding core may be attached to the rotation shaft of the winding machine, starting end portions of the separator 33 and the separator 34 may be welded to the winding core, and the separator 33, the negative electrode 32, the separator 34, and the positive electrode 31 may be laminated and wound. After completing the electrode group manufacturing step S5, for example, the assembling step S6 starts.

The assembling step S6 is a step of assembling the battery container 10, the external terminal 20, the wound body 30, the current collector plate 40, and the insulating sheet 50 to constitute the secondary battery 100. Specifically, as illustrated in FIG. 2, the connecting portions 22 of the external terminals 20 are inserted through the through holes 13a of the gaskets 13, the through holes 12a of the battery lid 12, the through holes 14a of the insulating members 14, and the through holes 41a of the current collector plates 40, and distal ends of the connecting portions 22 of the external terminals 20 are plastically deformed to form caulking portions.

Accordingly, the external terminal 20, the gasket 13, the insulating member 14, and the current collector plate 40 are integrally mounted to the battery lid 12, and the external terminal 20 and the current collector plate 40 are electrically connected. The battery lid 12 is electrically insulated from the external terminals 20 and the current collector plates 40 by the gaskets 13 and the insulating members 14. Furthermore, the laminated portion 35 of the wound body 30 is joined to the extending portions 42 of the current collector plates 40.

Accordingly, the positive electrode external terminal 20P is connected to the positive electrode current collector portion 31c of the positive electrode 31 via the positive electrode current collector plate 40P, and the negative electrode external terminal 20N is connected to the negative electrode current collector portion 32c of the negative electrode 32 via the negative electrode current collector plate 40N. The lid assembly in which the wound body 30 is supported to the battery lid 12 via the current collector plates 40 can be constituted. Subsequently, the insulating sheet 50 is wound around the wound body 30 and the current collector plates 40 to cover the wound body 30 and the current collector plates 40 with the insulating sheet 50.

The wound body 30 and the current collector plates 40 covered with the insulating sheet 50 are inserted through the opening 11a of the battery can 11, thus housing them in the battery can 11. Subsequently, in a state where the opening 11a of the battery can 11 is covered with the battery lid 12, the whole circumference of the battery lid 12 is joined to the battery can 11 by a laser beam welding and the like, thus constituting the battery container 10. Subsequently, a non-aqueous electrolyte is injected into the battery container 10 from the liquid injection hole 16 of the battery lid 12, and the liquid injection plug 17 is joined to the liquid injection hole 16 to seal the battery container 10 by the laser beam welding and the like. Accordingly, the secondary battery 100 illustrated in FIG. 1 can be manufactured.

As described above, the manufacturing method M of the lithium ion secondary battery of this embodiment is a method for manufacturing the lithium ion secondary battery in which the positive electrode 31 is opposed to the negative electrode 32 via the separators 33, 34. As described above, the manufacturing method M of the lithium ion secondary battery of this embodiment includes the following steps. The applying step S1 of applying the first slurry SL1 containing the first positive electrode active material particles Pd over the surface of the positive electrode current collector foil 31a and applying the second slurry SL2 containing the second positive electrode active material particles Ps over the surface of the first slurry SL1, the second positive electrode active material particles Ps having the larger average particle diameter and the higher tap density than the first positive electrode active material particles Pd. The drying step S2 of drying the first slurry SL1 applied over the surface of the positive electrode current collector foil 31a and the second slurry SL2 applied over the surface of the first slurry SL1, forming the deep layer portion 31d containing the first positive electrode active material particles Pd on the surface of the positive electrode current collector foil 31a, and forming the superficial layer portion 31s containing the second positive electrode active material particles Ps on the surface of the deep layer portion 31d. The pressing step S3 of pressurizing the laminated body L in which the deep layer portion 31d is disposed on the surface of the positive electrode current collector foil 31a and the superficial layer portion 31s is disposed on the surface of the deep layer portion 31d through the drying step S2. The cutting step S4 of cutting the laminated body L that has undergone the pressing step S3 to obtain the positive electrode 31 that includes the positive electrode mixture layer 31b including the superficial layer portion 31s and the deep layer portion 31d. The electrode group manufacturing step S5 of causing the positive electrode 31 to oppose the negative electrode 32 via the separators 33, 34, and causing the superficial layer portion 31s of the positive electrode mixture layer 31b to oppose the negative electrode 32 via the separators 33, 34.

That is, in the manufacturing method M of the lithium ion secondary battery of this embodiment, as described above, the second slurry SL2 is laminated on the first slurry SL1 in the applying step S1, and the first slurry SL1 and the second slurry SL2 are simultaneously dried in the drying step S2. Subsequently, the laminated body L that has undergone the drying step S2 is pressurized in the pressing step S3. Therefore, the secondary battery 100 manufactured by the manufacturing method M of the lithium ion secondary battery of this embodiment has an unevenness on an interface between the superficial layer portion 31s and the deep layer portion 31d included in the positive electrode mixture layer 31b of the positive electrode 31. Accordingly, the deep layer portion 31d and the superficial layer portion 31s are integrated, thus allowing manufacturing the secondary battery 100 that is excellent in durability and increased in capacity compared with the conventional one as described above.

Meanwhile, it is considered that after applying the first slurry SL1 over the surface of the positive electrode current collector foil 31a, the first slurry SL1 is dried to form the deep layer portion 31d, the deep layer portion 31d is pressed to be pressurized, and subsequently, the second slurry SL2 is applied over the surface of the deep layer portion 31d. In this case, the surface of the deep layer portion 31d is pressed to be flattened. Therefore, when the second slurry SL2 applied over the surface of the deep layer portion 31d is dried to form the superficial layer portion 31s, and the superficial layer portion 31s is pressed to be pressurized, the interface between the superficial layer portion 31s and the deep layer portion 31d becomes a flat surface without an unevenness as described above. However, this method not only reduces the productivity, but also possibly causes the superficial layer portion 31s and the deep layer portion 31d to be insufficiently joined. Accordingly, the secondary battery 100 is preferably manufactured by the above-described manufacturing method M of the lithium ion secondary battery.

While the embodiments of the lithium ion secondary battery and the manufacturing method thereof according to the disclosure have been described in detail using the drawings, the specific configuration is not limited to the embodiments. Design changes and the like within a scope not departing from the gist of the disclosure are included in the disclosure.

REFERENCE SIGNS LIST

31 Positive electrode
31a Positive electrode current collector foil
31b Positive electrode mixture layer
31d Deep layer portion
31s Superficial layer portion
32 Negative electrode
33 Separator
33 Separator
L Laminated body
M Manufacturing method of lithium ion secondary battery
Pd Positive electrode active material particles (first positive electrode
active material particles)
Ps Positive electrode active material particles (second positive electrode active material particles)
S1 Applying step
S2 Drying step
S3 Pressing step
S4 Cutting step
S5 Electrode group manufacturing step
SL1 First slurry
SL2 Second slurry

The invention claimed is:
1. A lithium ion secondary battery comprising:
a positive electrode;
a negative electrode; and
a separator,
wherein the positive electrode includes a positive electrode current collector foil and a positive electrode mixture layer disposed on a surface of the positive electrode current collector foil,
wherein the positive electrode mixture layer includes a superficial layer portion and a deep layer portion, the superficial layer portion opposes the negative electrode via the separator, and the deep layer portion is disposed between the superficial layer portion and the positive electrode current collector foil,
wherein the superficial layer portion contains positive electrode active material particles having an average particle diameter larger than an average particle diameter of positive electrode active material particles contained in the deep layer portion,
wherein a space ratio between the positive electrode active material particles in the superficial layer portion is lower than a space ratio between the positive electrode active material particles in the deep layer portion;

wherein a cobalt content of the positive electrode active material particles contained in the superficial layer portion is higher than a cobalt content of the positive electrode active material particles contained in the deep layer portion;

wherein the positive electrode active material particles contained in at least one of the superficial layer portion and the deep layer portion are composed of a nickel cobalt lithium manganate and wherein a ratio of cobalt metal elements constituting anions of the positive electrode active material particles composed of the nickel cobalt lithium manganate is more than 18% and less than 40% in terms of molar percentage with respect to all metals constituting anions.

2. The lithium ion secondary battery according to claim 1, wherein the average particle diameter of the positive electrode active material particles contained in the superficial layer portion is 5 μm or more and 12 μm or less, and wherein the average particle diameter of the positive electrode active material particles contained in the deep layer portion is 3 μm or more and 8 μm or less.

3. The lithium ion secondary battery according to claim 1, wherein the space ratio in the superficial layer portion is 25% or more and 14% or less, and wherein the space ratio in the deep layer portion is 28% or more and 15% or less.

4. A method for manufacturing a lithium ion secondary battery in which a positive electrode is opposed to a negative electrode via a separator, the method comprising:

an applying step of applying a first slurry over a surface of a positive electrode current collector foil and applying a second slurry over a surface of the first slurry, the first slurry containing first positive electrode active material particles, the second slurry containing second positive electrode active material particles having a larger average particle diameter and a higher tap density than the first positive electrode active material particles;

a drying step of drying the first slurry applied over the surface of the positive electrode current collector foil and the second slurry applied over the surface of the first slurry, forming a deep layer portion containing the first positive electrode active material particles on the surface of the positive electrode current collector foil, and forming a superficial layer portion containing the second positive electrode active material particles on a surface of the deep layer portion;

a pressing step of pressurizing a laminated body in which the deep layer portion is disposed on the surface of the positive electrode current collector foil and the superficial layer portion is disposed on the surface of the deep layer portion through the drying step;

a cutting step of cutting the laminated body that has undergone the pressing step to obtain a positive electrode that includes a positive electrode mixture layer including the superficial layer portion and the deep layer portion;

an electrode group manufacturing step of causing the positive electrode to oppose the negative electrode via the separator, and causing the superficial layer portion of the positive electrode mixture layer to oppose the negative electrode via the separator;

wherein a cobalt content of the positive electrode active material particles contained in the superficial layer portion is higher than a cobalt content of the positive electrode active material particles contained in the deep layer portion;

wherein the positive electrode active material particles contained in at least one of the superficial layer portion and the deep layer portion are composed of a nickel cobalt lithium manganate and wherein a ratio of cobalt metal elements constituting anions of the positive electrode active material particles composed of the nickel cobalt lithium manganate is more than 18% and less than 40% in terms of molar percentage with respect to all metals constituting anions.

5. The lithium ion secondary battery of claim 1, wherein the positive electrode active material has the formula $Li(Ni_xCo_yMn_{1-x-y})O_2$, wherein $0.30 < x \leq 0.85$ and $0.18 < y < 0.40$.

6. A method for manufacturing a lithium ion secondary battery of claim 4, wherein the positive electrode active material has the formula $Li(Ni_xCo_yMn_{1-x-y})O_2$, wherein $0.30 < x \leq 0.85$ and $0.18 < y < 0.40$.

\* \* \* \* \*